US006096281A

United States Patent [19]

Bulko et al.

[11] Patent Number: 6,096,281

[45] Date of Patent: *Aug. 1, 2000

[54] METHOD FOR PRODUCING URANIUM OXIDE FROM URANIUM OXYFLUORIDE

[75] Inventors: John B. Bulko, Franklin; Bridget M. Smyser, Needham, both of Mass.

[73] Assignee: Starmet Corporation, Concord, Mass.

[ * ] Notice: This patent is subject to a terminal disclaimer.

[21] Appl. No.: 09/280,890

[22] Filed: Mar. 29, 1999

[51] Int. Cl.[7] ........................ C01G 43/01; C01G 43/025; C01B 35/06; C01B 9/00

[52] U.S. Cl. .......................... 423/260; 423/261; 423/293; 423/491; 423/495; 423/492; 423/301

[58] Field of Search .................................... 423/260, 261, 423/293, 3, 491, 495, 492, 301, 509, 494

[56] References Cited

U.S. PATENT DOCUMENTS

| | | | |
|---|---|---|---|
| 3,167,388 | 1/1965 | Rhodes | 423/260 |
| 3,168,369 | 2/1965 | Reese et al. | 423/261 |
| 3,845,193 | 10/1974 | Littlechild et al. | 423/261 |
| 4,020,146 | 4/1977 | Knudsen | 423/261 |
| 4,382,071 | 5/1983 | Otsuka et al. . | |
| 4,412,861 | 11/1983 | Kreuzmann . | |
| 4,470,959 | 9/1984 | Talwar et al. . | |
| 4,615,872 | 10/1986 | Porcham . | |
| 4,943,423 | 7/1990 | Evans et al. | 423/293 |

FOREIGN PATENT DOCUMENTS

| | | | |
|---|---|---|---|
| 2060242 | 6/1971 | France | 423/261 |
| 3619391 | 12/1986 | Germany | 423/261 |
| 3841 222 A1 | 6/1990 | Germany . | |
| 3841209 A1 | 6/1990 | Germany . | |
| 3841212 A1 | 6/1990 | Germany . | |
| 3841218 A1 | 6/1990 | Germany . | |
| 3841220 A1 | 6/1990 | Germany . | |

OTHER PUBLICATIONS

Katz, Joseph J. and Rabinowitch, Eugene, "The Chemistry of Uranium", Part I, The Element, Its Binary and Related Compounds, 1951, p. 376.

Boissin, P. et al., "Tucson–WM98 Uranium Hexafluoride Industrial Defluorination", 1998, pp. 1–8.

*Primary Examiner*—Steven Bos
*Attorney, Agent, or Firm*—Iandiorio & Teska

[57] ABSTRACT

A method for producing uranium oxide includes combining uranium oxyfluoride and a solid oxidizing agent having a lower thermodynamic stability than the uranium oxide after "oxide"; heating the combination below the vapor point of the uranium oxyfluoride to sufficiently react the uranium oxyfluoride and the oxidizing agent to produce uranium oxide and a non-radioactive fluorine compound; and removing the fluorine compound after "compound".

26 Claims, 5 Drawing Sheets

METHOD FOR PRODUCING URANIUM OXIDE FROM URANIUM OXYFLUORIDE

FIELD OF INVENTION

This invention relates to a method for producing uranium oxide and more particularly to a method for converting uranium oxyfluoride into uranium oxide and producing a non-radioactive fluorine compound which is free of contaminants.

BACKGROUND OF INVENTION

Uranium is a naturally occurring element which is comprised of approximately 0.7% $^{235}U$ and 99.3% $^{238}U$. $^{235}U$ is used to produce Nuclear Energy, while $^{238}U$ is not. Because of the low percentage of $^{235}U$ found in naturally occurring uranium, naturally occurring uranium must be enriched in order to obtain sufficient amounts of $^{235}U$ to support nuclear fission. This enrichment process, aside from producing high concentrations of $^{235}U$, produces huge amounts of depleted uranium hexafluoride ($UF_6$) by-product which is a very hazardous compound posing a serious health threat. Since depleted uranium metal is radioactive and expensive to produce, it is used in limited quantities for highly specialized applications. Accordingly, alternative uses are needed in order to avoid having to dispose of the $UF_6$ at great expense by storing it indefinitely. One solution to reducing the large stores of $UF_6$ is to convert the $UF_6$ into uranium oxide, e.g. $UO_2$ or $U_3O_8$.

One use for uranium oxide is to add it to the concrete which is used to build bunkers in which radioactive waste is stored in order to provide high density shielding for the stored high level radioactive waste. Uranium oxide possesses outstanding radioactive shielding properties and when added to concrete in the form of aggregate makes a very effective, low cost shielding material.

There are many methods which can be used to convert $UF_6$ into uranium oxide. Many of these methods also produce potentially valuable by-products. However, methods which are currently used to convert the $UF_6$ into uranium oxide taint these valuable by-products with radioactive uranium, rendering the by-products commercially unusable, requiring additional processing to remove the radioactivity, as well as additional contaminants, or disposing of the by-products as low level radioactive waste.

The most common method for producing uranium oxide includes reacting uranium hexafluoride with steam ($H_2O$) and hydrogen ($H_2$). This produces uranium oxide and hydrogen fluoride gas (HF). However, because the products and reactants are mixed in the gas phase, this HF gas, although having economic value, is contaminated by unreacted uranium thus reducing its value as discussed above. Also, this HF gas is highly diluted from addition or excess amounts of steam.

Another method for producing uranium oxide reacts $UF_6$ with $H_2$ to produce uranium tetrafluoride ($UF_4$) and HF gas. The $UF_4$ is then reacted with steam to produce a uranium oxide, $UO_2$ or $U_3O_8$, and HF gas. However, the reverse reaction is so strong that tremendous amounts of steam must be used to avoid a reverse reaction. This not only requires a large amount of energy to produce the steam, but again produces a highly diluted hydrogen fluoride product that has little commercial value, requiring further processing to obtain a valuable product. Moreover, complete conversion to uranium oxide is nearly impossible thereby degrading the uranium oxide's suitability for making concrete and thus the value of the uranium oxide produced.

Accordingly, the major drawbacks of the presently preferred methods are that the HF is diluted and contaminated with some amount of uranium making it commercially unusable. Thus, while HF has some economic value, the uranium contamination reduces this value and further provides yet another storage dilemma, as encountered with all radioactive waste, or additional processing to purify the HF.

Moreover, these methods are very expensive. Thus, an economical way to convert $UF_6$ to uranium oxide is needed in order to make use of the large quantities of $UF_6$ in storage and produce commercially valuable by-products which are not radioactive and require no additional processing.

SUMMARY OF INVENTION

It is therefore an object of this invention to provide a method for producing uranium oxide from uranium oxyfluoride;

It is a further object of the present invention to provide such a method which produces uranium oxide without radioactive by-products.

It is a further object of the present invention to provide such a method which produces a fluorine compound which is free from radioactive contaminants;

It is a further object of the present invention to provide such a method which produces a fluorine compound which is not diluted with water;

It is a further object of the present invention to provide such a method which completely reacts the uranium oxyfluoride into uranium oxide.

It is a further object of the present invention to provide such a method which is cost effective to implement;

The invention results from the realization that a truly efficient and cost effective method for producing uranium oxide can be achieved by combining uranium oxyfluoride and a solid oxidizing agent, having a lower thermodynamic stability than any uranium oxide produced, in stoichiometric proportion so that when the combination is heated to a temperature below the vapor or melting point of the uranium oxyfluoride or the solid the uranium oxyfluoride completely reacts with the oxidizing agent to produce uranium oxide and a volatile fluorine compound free from radioactive carryover and other contaminants.

This invention features a method for producing uranium oxide including combining uranium oxyfluoride and a solid oxidizing agent having a lower thermodynamic stability than the uranium oxide to be produced, heating the combination below the vapor point of the uranium oxyfluoride to sufficiently react the uranium oxyfluoride and the oxidizing agent to produce uranium oxide and non-radioactive fluorine compound, and removing the fluorine compound.

In a preferred embodiment, the uranium oxyfluoride and the oxidizing agent are combined in stoichiometric proportion. The oxidizing agent may include a solid metal oxide that reacts with uranium oxyfluoride to produce a volatile fluorine compound. The oxidizing agent may include a solid metal oxide that reacts with the uranium oxyfluoride to produce a gaseous fluorine compound. The method may further include introducing oxygen to the reaction. Heating may include heating the combination in a temperature range of 400° C. to 1000° C. The oxidizing agent may be selected from the group of oxides of phosphorus, germanium, arsenic, thallium, antimony, titanium, selenium, tin and niobium. The uranium oxide produced may include $U_3O_8$. The fluorine compound produced may include $PF_5$, $AsF_3$, $SbF_3$, or TlF. The uranium oxide produced may include $UO_2$. The fluorine compound produced may included $GeF_2$, $GeF_4$, $NbF_5$, $TiF_4$, $SnF_2$, TIF, $SeF_4$. The oxidizing agent may include $B_2O_3$. The uranium oxide produced may include $U_3O_8$ and the fluorine compound may include $BF_3$. The uranium oxyfluoride may be powdered and the oxidizing agent may be granular or powdered. Heating may include heating the combination below the vapor point of the oxidizing agent. Heating may include heating the combination below the melting point of the uranium oxyfluoride.

The invention also features uranium oxide produced by the combining of uranium oxyfluoride and a solid oxidizing agent having lower thermodynamic stability than the uranium oxide to be produced, heating the combination below the vapor point of the uranium oxyfluoride to sufficiently react the uranium oxyfluoride and the oxidizing agent to produce the uranium oxide and a non-radioactive fluorine compound, and removing the fluorine compound.

In a preferred embodiment the uranium oxide. The uranium oxide may be $U_3O_8$.

The invention also features boron trifluoride produced by combining uranium oxyfluoride and boric oxide, heating the combination below the vapor point of the uranium oxyfluoride to sufficiently react the uranium oxyfluoride and the boric oxide to produce a uranium oxide and the boron trifluoride, and removing the boron trifluoride.

BRIEF DESCRIPTION OF THE DRAWINGS

Other objects, features and advantages will occur to those skilled in the art from the following description of a preferred embodiment and the accompanying drawings, in which.

DETAILED DESCRIPTION OF THE PREFERRED EMBODIMENT

Figure 1:
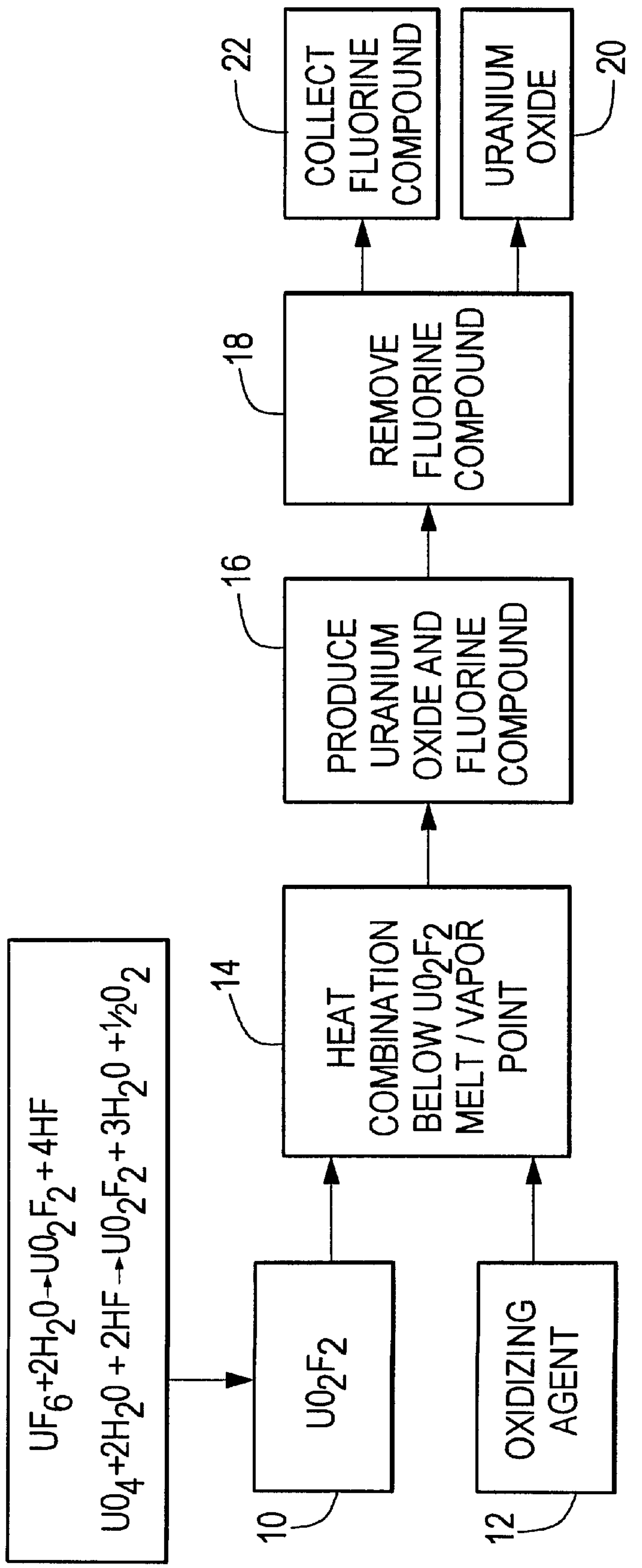
FIG. 1 is a block diagram of the method for producing uranium oxide according to the present invention.

Uranium hexafluoride $UF_6$ is reacted with $H_2O$ to produce uranium oxyfluoride ($UO_2F_2$) 10, FIG. 1. By simply placing the $UF_6$ in close proximity to water, not necessarily steam, the water vapor reacts with the $UF_6$ and $UO_2F_2$ precipitates directly from the air. This, however, is only one example of how the $UO_2F_2$ may be produced. See also U.S. Pat. Nos. 4,701,310 and 4,793,978. The $UO_2F_2$ 10 is combined with a solid oxidizing agent 12, for example, a metal oxide, and the combination is heated 14 below the vapor or melting point of $UO_2F_2$ to produce uranium oxide and a fluorine compound 16 without uranium carryover. The non-radioactive fluorine compound is then removed 18, for example by gas separation, leaving only the completely reacted uranium oxide 20, and the fluorine compound is collected 22.

Figure 2:
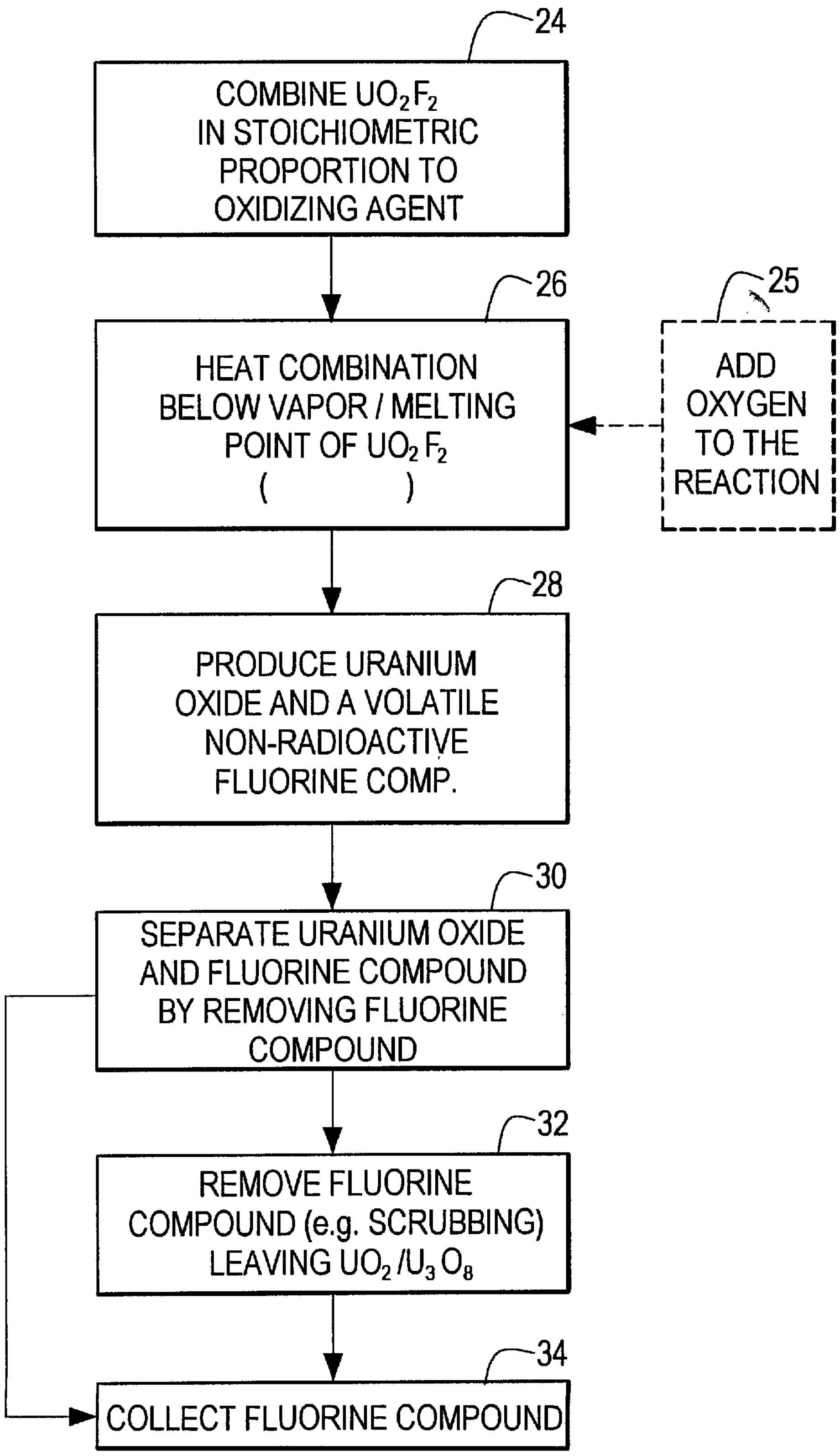
FIG. 2 is a flow chart of the method for producing uranium oxide according to the present invention.

The $UO_2F_2$ is combined in stoichiometric proportion to the oxidizing agent, block 24, FIG. 2. This ensures that the $UO_2F_2$ is completely reacted. The oxidizing agent may be mixed, however, in slight excess of its stoichiometric proportion. The oxidizing agent is chosen such that it has a lower thermodynamic stability than any oxide of uranium, $UO_2$, $UO_3$ or $U_3O_8$, which may be produced. This is done so that when the combination is heated to sufficiently react the oxidizing agent with the uranium oxyfluoride, block 26, the oxide compound readily gives up its oxygen and an oxide of uranium and a volatile, or gaseous, fluorine compound are produced, block 28. In some instances oxygen may be added, block 25 shown in phantom, in the form of dry air, for example, in order to obtain a desired oxide compound.

The combination is heated, block 26, only to a temperature below the melting point, or at most the vapor point of the uranium oxyfluoride, typically within a temperature range of 400° C. to 1000° C. Heating the combination below the vapor point of either component prevents vaporization of the uranium, ensuring that the uranium does not enter the gaseous phase and thus contaminate the fluorine product with radioactive uranium, and that the fluorine compound produced is not contaminated by any other compound, but remains essentially pure.

Moreover, heating the stoichiometric combination below either the vapor or melting point of $UO_2F_2$ further ensures that the $UO_2F_2$ completely reacts with the oxidizing agent, because no unreacted uranium is lost to the fluorine compound. Producing a volatile or gaseous fluorine compound allows the uranium oxide and fluorine compound to be easily separated so that the nonradioactive fluorine compound may be removed, block 30.

Once the fluorine compound has been removed, block 32, for example by scrubbing the fluorine compound using an absorbent bed or trapping the fluorine compound with a reactive agent to separate out the fluorine compound, the fluorine compound can be collected, block 34. This is not a necessary limitation of the invention, however, as the fluorine compound may also be directly collected. The fluorine compound is recovered from the bed material or trap residue through thermal treatment, well known in the art. Scrubbing in this manner is primarily done to verify the presence and purity of the fluorine compound.

Thus, by heating the $UO_2F_2$ below its vapor or melting point ensures not only that the fluorine compound is not contaminated by unreacted uranium, but that all the uranium oxyfluoride is reacted due to the stoichiometric proportions in which the combination was mixed and the elimination of uranium carryover, producing a valuable oxide of uranium.

Choosing an oxidizing agent having a lower thermodynamic stability than any oxide of uranium which may be produced, as determined by the enthalpy of formation, further ensures the uranium oxyfluoride is completely reacted.

For example, $U_3O_8$ has a an enthalpy of formation of 854.1 kcal/mole, as shown in Table 1.

TABLE 1

| OXIDE | ENTHALPY OF FORMATION ($-\Delta H_f$°298)kcal/mole |
|---|---|
| $U_3O_8$ | 854.1 |
| $UO_2$ | 259.0 |
| $B_2O_3$ | 306.1 |
| $UO_3$ | 294.0 |

When the oxidizing agent is a metal oxide such as $B_2O_3$, having an enthalpy of formation of 306.1 kcal/mole, the $B_2O_3$ readily gives up its oxygen which is readily accepted by the uranium to produce, $UO_2$, $UO_3$ and $U_3O_8$ and $BF_3$ according to the reactions $$6UO_2F_2(s)+2B_2O_3(s)\rightarrow 2U_3O_8(s)+4BF_3(g)+O_2(g) \quad (1)$$

$$3UO_2F_2(s)+B_2O_3(s)\rightarrow 3UO_3(s)+2BF_3(g) \quad (2)$$

$$3UO_2F_2(s)+B_2O_3\rightarrow 3UO_2+2BF_3+1.5O_2(g) \quad (3)$$

Other oxides that may be used and the fluorine compounds that may be produced are shown in Table 2.

TABLE 2

| Solid Oxide Compound | Enthalpy of Formation ($-\Delta H_f$°298) | Fluorine Compound |
|---|---|---|
| $As_2O_3$ | 156 | $AsF_3$ |
| $As_2O_5$ | 218 | $AsF_3$ |
| GeO | 11 | $GeF_2/GeF_4$ |
| $GeO_2$ | 132 | $GeF_4$ |
| NbO | 98 | $NbF_5$ |
| $NbO_2$ | 190 | $NbF_5$ |
| $PO_2$ | 65 | $PF_3/PF_5$ |
| $SbO_2$ | 108 | $SbF_3$ |
| $Sb_2O_3$ | 169 | $SbF_3$ |
| $Sb_2O_4$ | 217 | $SbF_3$ |
| $Sb_2O_5$ | 232 | $SbF_3$ |
| $Sb_4O_6$ | 339 | $SbF_3$ |
| $SeO_3$ | 41 | $SeF_4$ |
| SnO | 68 | $SnF_2$ |
| TiO | 124 | $TiF_4$ |
| $TiO_2$ | 226 | $TiF_4$ |
| $Ti_2O_3$ | 363 | $TiF_4$ |
| $Ti_3O_5$ | 587 | $TiF_4$ |
| $Ti_4O_7$ | 814 | $TiF_4$ |
| $Tl_2O$ | 42 | TlF |
| $Tl_2O_3$ | 84 | TlF |

However, this is not a necessary limitation of the invention as these oxides exist in multiple oxidation states, well known in the art. Thus, different oxides of phosphorous (P), germanium (Ge), arsenic (As), thallium (Tl), antimony (Sb), titanium (Ti), tin (Sn), Tungsten (W), selenium (Se) or Niobium (Nb) may be used as an oxidizing agent in addition to those described above.

Examples of the reactions which produce the above compounds include:

$$6UO_2F_2+2As_2O_3\rightarrow 2U_3O_8+4AsF_3+O_2 \quad (4)$$

$$3UO_2F_2+As_22O_5\rightarrow U_3O_8+2AsF_3+1.5O_2 \quad (5)$$

$$UO_2F_2+GeO\rightarrow UO_3+GeF_2 \quad (6)$$

$$6UO_2F_2+3GeO_2\rightarrow 2U_3O_8+3GeF_4+O_2 \quad (7)$$

-continued $$15UO_2F_2+6NbO_2\rightarrow 5U_3O_8+NbF_5+O_2 \quad (8)$$

$$3UO_2F_2+2PO_2\rightarrow U_3O_8+2PF_3+O_2 \quad (9)$$

$$2.5UO_2F_2+PO_2\rightarrow 2.5UO_2+PF_5+O_2 \quad (10)$$

$$3UO_2F_2+Sb_2O_3\rightarrow 3UO_3+2SbF_3 \quad (11)$$

$$3UO_2F_2+1.5SeO_3\rightarrow U_3O_8+1.5SeF_4+1.25O_2 \quad (12)$$

$$6UO_2F_2+6SnO\rightarrow 2U_3O_8+6SnF_2+O_2 \quad (13)$$

$$6UO_2F_2+3TiO_2\rightarrow 2U_3O_8+3TiF_4+O_2 \quad (14)$$

$$UO_2F_2+Tl_2O\rightarrow UO_3+2TlF \quad (15)$$

Depending on the oxide chosen, additional oxygen, $O_2$, may be introduced to the reaction in order to obtain the desired oxide of uranium, $UO_2$ or $U_3O_8$.

EXAMPLE

Figure 3:
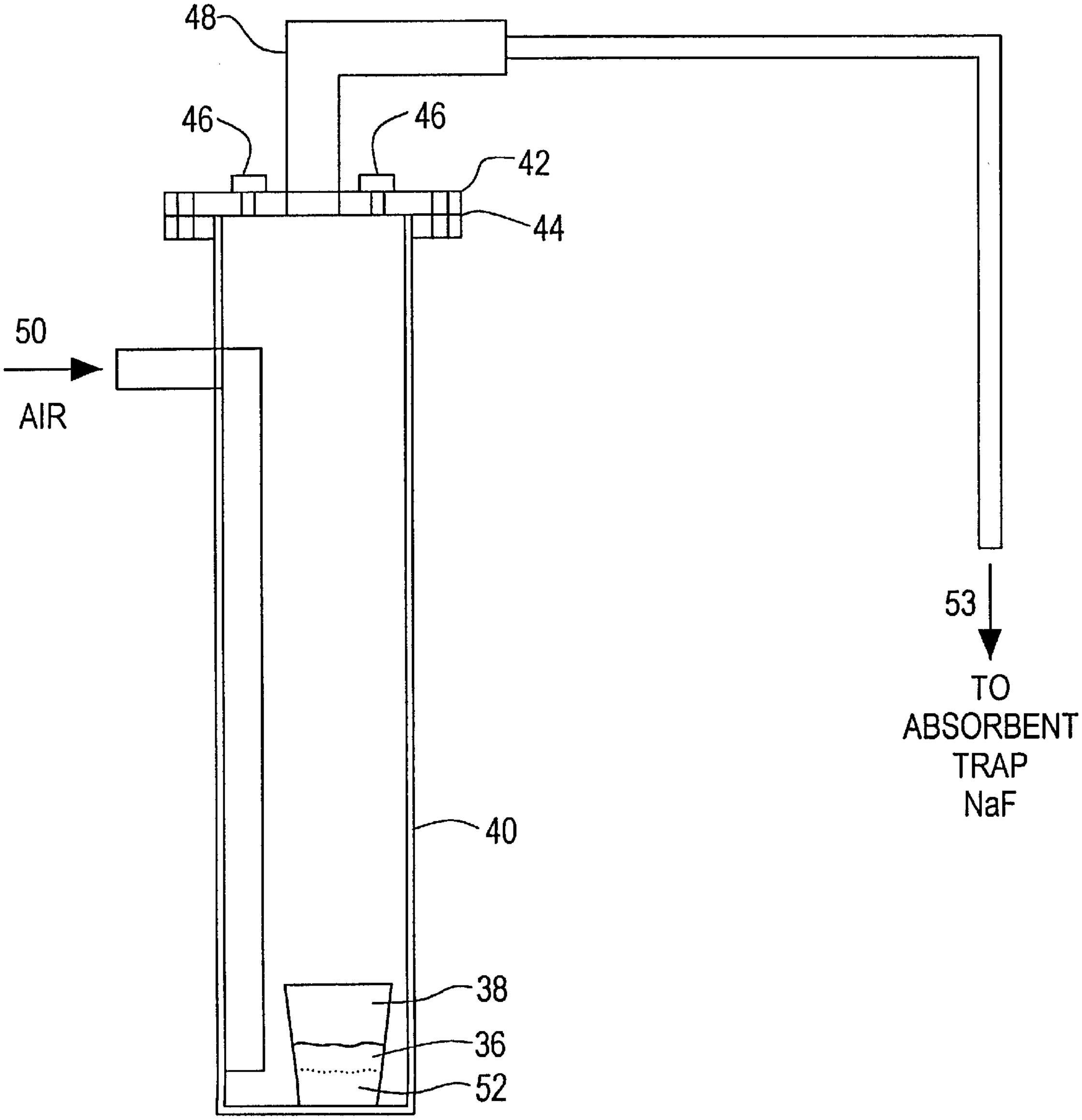
FIG. 3 is a schematic diagram of the apparatus used to produce the uranium oxide and fluorine product according to the present invention.

An amount of 20.2052 grams of uranium oxyfluoride was combined with 1.6893 grams of boric oxide. The combination was vigorously shaken for ten minutes to thoroughly mix the combination. The combination 36, FIG. 3, was transferred to a high density, non-porous, alumina (99.8%) ceramic crucible 38. The crucible was then placed at the bottom of larger vessel 40, made of HAYNES HR 160 ALLOY and sealed with corrosion resistant cap 42 and TEFLON gasket seal 44. Cap 42 has inlet ports 46 and outlet port 48 for allowing the gas to flow through vessel 40.

Sealed vessel 40 was placed in a crucible furnace, not shown. One of inlet ports 46 was capped and the other was used to introduce dry air to the combination at 200–250 cc/min. This flow was maintained throughout the reaction.

Vessel 40 was heated to 700° C. in 10°/min. increments and maintained for 3 hours thereafter. Vessel 40 was cooled to ambient temperature in 20°/min. increments and crucible 38 removed from vessel 40. Post reaction residue 52, shown in phantom, was gray-black in color, and flowed easily from crucible 38.

Conversion of $UO_2F_2$ to $U_3O_8$ was essentially complete, at greater than 95% yield as determined by x-ray diffraction of the reaction residue which showed only traces amounts of $UO_2F_2$ remaining after reaction.

Figures 4A, 4B:
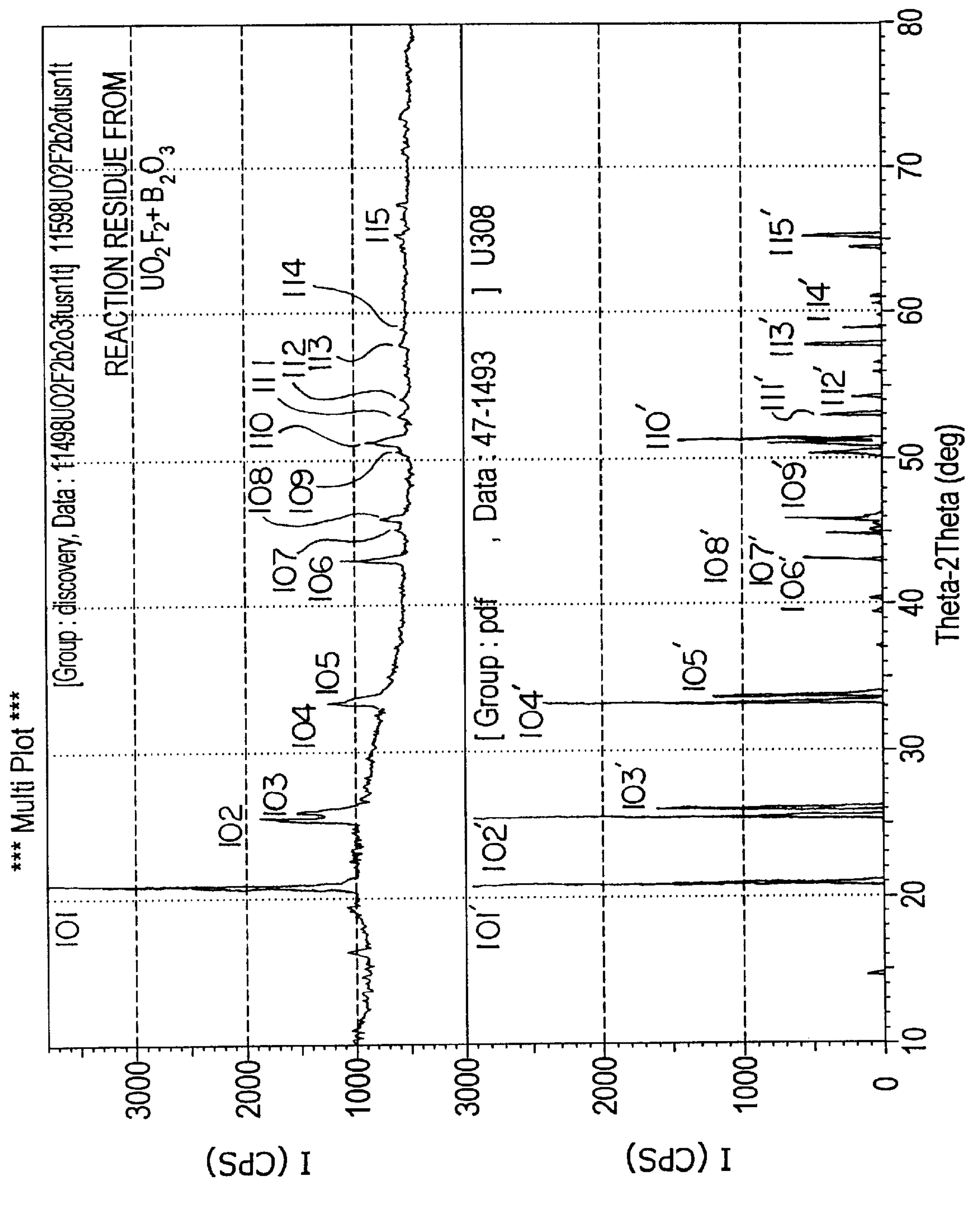
FIG. 4A is a representation of an x-ray diffraction analysis performed on the uranium oxide produced according to the method of the present invention.
FIG. 4B is a representation of a standard x-ray diffraction pattern for $U_3O_8$ for comparison to FIG. 4A.

Verification of reaction of the constituents to produce oxides of uranium was achieved using x-ray powder diffraction analysis on post reaction residue 52. X-ray diffraction pattern 54, FIG. 4A, of the product residue was compared to a reference x-ray diffraction reference pattern 56, FIG. 4B, for $U_3O_8$. The correlation of peaks 101–115 of reaction pattern 54 with peaks 101'–115' of $U_3O_8$ reference pattern 56 indicates the presence of $U_3O_8$ in post reaction residue, 52.

Verification of the fluorine compound may be done in several ways to include collection of the gaseous $BF_3$ and performing gas analysis, passing the fluorine compound over an absorbent bed and analyzing the bed material, or chemically reacting the fluorine compound in a trap and analyzing the product using x-ray diffraction as discussed above.

The reaction occurring in the trap in this particular example is given by the equations:

$$NaF(s)+BF_3(g)\rightarrow NaBF_4(s) \quad (12)$$

Verification of $BF_3$ was done indirectly using x-ray diffraction on the sodium fluoroborate ($NaBF_4$) produced.

Figures 5A, 5B:
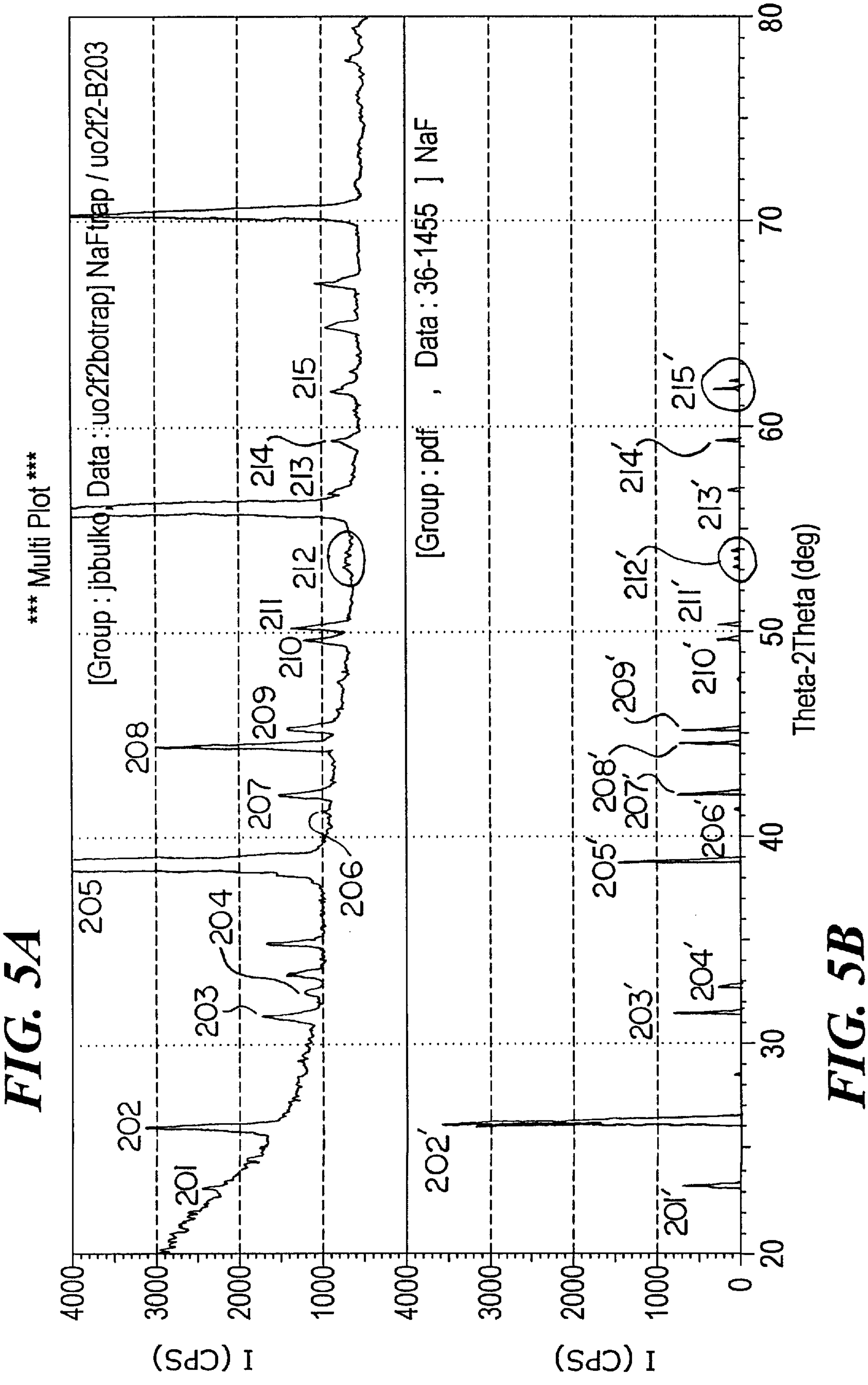
FIG. 5A is a representation of an x-ray diffraction analysis performed on the residue obtained from reacting the fluorine compound produced according to the method of the present invention with a scrubbing agent.
FIG. 5B is a representation of a standard x-ray diffraction pattern for sodium fluoroborate to verify the presence of the fluoroborate compound produced.

X-ray diffraction pattern 60, FIG. 5A, of the trap reaction residue was compared to theoretical reference pattern 64, FIG. 5B, for $NaBF_4$. The correlation of peaks 201–215 of reaction pattern 60 and peaks 201'–215' of theoretical reference pattern 64 indicates the presence of $NaBF_4$, and thus indicates the presence of $BF_3$.

Verification of $NaBF_4$ indirectly verifies the presence of $BF_3$ based on the equation (12) above. The collected $BF_3$ may be liberated through the reaction of trap residue with $B_2O_3$ commencing above 400° C.

Thus, the method according to the present invention reacts the uranium, and produces a fluorine compound of very high purity by heating the stoichiometric combination below the vapor or melting point of the uranium oxyfluoride. The uranium oxyfluoride reacts to produce uranium oxide without radioactive carryover into the fluorine compound by-product producing a commercially valuable product without requiring additional processing or low level radioactive storage. Producing uranium oxide from uranium oxyfluoride, rather than directly from uranium hexafluoride, produces less radioactive and diluted HF than if all the fluorine value in $UF_6$ was converted to HF.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A method for producing uranium oxide comprising:

combining uranium oxyfluoride and a solid oxidizing agent having lower thermodynamic stability than the uranium oxide produced;

heating the combination below the vapor point of the uranium oxyfluoride to sufficiently react the uranium oxyfluoride and the oxidizing agent to produce uranium oxide and a non-radioactive fluorine compound; and removing the fluorine compound.

2. The method of claim 1 in which combining includes combining the uranium oxyfluoride and the oxidizing agent in stoichiometric proportion.

3. The method of claim 2 in which the oxidizing agent includes a solid metal oxide that reacts with the uranium oxyfluoride to produce a volatile fluorine compound.

4. The method of claim 2 in which the oxidizing agent includes a solid metal oxide that reacts with uranium oxyfluoride to produce a gaseous fluorine compound.

5. The method of claim 1 in which heating includes heating the combination in the temperature range of 400 to 1000° C.

6. The method of claim 5 in which the oxidizing agent is selected from the group of oxides of phosphorus, germanium, arsenic, thallium, antimony, tin, titanium, selenium and niobium.

7. The method of claim 6 in which the uranium oxide produced includes $U_3O_8$.

8. The method of claim 7 in which the fluorine compound includes $PF_5$.

9. The method of claim 7 in which the fluorine compound includes $PF_3$.

10. The method of claim 7 in which the fluorine compound includes $AsF_3$.

11. The method of claim 7 in which the fluorine compound includes TlF.

12. The method of claim 7 in which the fluorine compound includes a fluoride of antimony.

13. The method of claim 7 in which the fluorine compound includes $SnF_2$.

14. The method of claim 7 in which the fluorine compound includes $NbF_5$.

15. The method of claim 7 in which the fluorine compound includes a fluoride of germanium.

16. The method of claim 7 in which the fluorine compound includes $TiF_4$.

17. The method of claim 7 in which the fluorine compound includes $SeF_4$.

18. The method of claim 1 in which the oxidizing agent includes $B_2O_3$.

19. The method of claim 18 in which the uranium oxide produced includes $U_3O_8$.

20. The method of claim 19 in which the fluorine compound includes $BF_3$.

21. The method of claim 1 in which the uranium oxyfluoride includes powdered uranium oxyfluoride.

22. The method of claim 21 in which the oxidizing agent includes a granular oxidizing agent.

23. The method of claim 21 in which the oxidizing agent include a powdered oxidizing agent.

24. The method of claim 1 in which heating further includes heating the combination below the vapor point of the oxidizing agent.

25. The method of claim 1 in which heating further includes heating the combination below the melting point of the uranium oxyfluoride.

26. A method for producing boron trifluoride comprising:

combining uranium oxyfluoride and boric oxide;

heating the combination below the vapor point of the uranium oxyfluoride to sufficiently react the uranium oxyfluoride and the boric oxide to produce a uranium oxide and a boron trifluoride; and removing the boron trifluoride.

* * * * *